(12) United States Patent
Chen

(10) Patent No.: US 6,764,175 B1
(45) Date of Patent: Jul. 20, 2004

(54) PLASTIC SUNGLASSES WITH SECONDARY OPTICAL GLASSES

(76) Inventor: Joy Chen, No. 24, Lane 420, Chien Kang Road, Tainan City (TW)

(*) Notice: Subject to any disclaimer, the term of this patent is extended or adjusted under 35 U.S.C. 154(b) by 0 days.

(21) Appl. No.: 10/420,406

(22) Filed: Apr. 22, 2003

(51) Int. Cl.$^7$ ................................................. G02C 9/00
(52) U.S. Cl. .......................................... 351/47; 351/57
(58) Field of Search ........................... 351/47, 57, 103, 351/104, 105, 106

(56) References Cited

U.S. PATENT DOCUMENTS 6,109,747 A * 8/2000 Chao ........................... 351/47
6,206,519 B1 * 3/2001 Lin ............................. 351/57

* cited by examiner

*Primary Examiner*—Huy Mai
(74) *Attorney, Agent, or Firm*—Charles E. Baxley

(57) ABSTRACT

A pair of glasses includes a primary pair of plastic sunglasses and secondary optical glasses. The primary pair of plastic sunglasses includes a frame and a sunglasses lens attached to the frame. The frame of the primary pair of plastic sunglasses includes a bridge at a central portion thereof. The bridge has a through-hole into which a first magnetic element is securely mounted. A groove is defined in an inner side of the bridge. The secondary optical glasses include a frame having two optical lenses mounted therein. The frame of the secondary optical glasses includes an engaging portion releasably engaged in the groove. A second magnetic element is attached to the engaging portion of the frame of the secondary optical glasses. An inner end of the first magnetic element and an outer end of the second magnetic element attract each other.

4 Claims, 3 Drawing Sheets

PLASTIC SUNGLASSES WITH SECONDARY OPTICAL GLASSES

BACKGROUND OF THE INVENTION

1. Field of the Invention

The present invention relates to a primary pair of plastic sunglasses having secondary optical glasses removably attached thereto, thereby providing a pair of glasses with increased utility, improved convenience to assembly, improved reliability, and improved appearance.

2. Description of the Related Art

A wide variety of glasses with different functions have heretofore been provided, including sunglasses, optical glasses, etc. Secondary glasses in the form of sunglasses have been proposed and are attached to the primary pair of optical glasses by magnetic elements. However, the sunglasses are apt to be disengaged from the primary pair of optical glasses when the whole pair of glasses or the user wearing the whole pair of glasses is impinged. Plastic sunglasses have low utility, as secondary glasses could not be attached thereto.

SUMMARY OF THE INVENTION

An object of the present invention is to provide a primary pair of plastic sunglasses having secondary optical glasses removably attached thereto, thereby providing a pair of glasses with increased utility, improved convenience to assembly, improved reliability, and improved appearance.

In accordance with the invention, a pair of glasses includes a primary pair of plastic sunglasses and secondary optical glasses. The primary pair of plastic sunglasses includes a frame and a sunglasses lens attached to the frame. The frame of the primary pair of plastic sunglasses includes a bridge at a central portion thereof. The bridge has a through-hole into which a first magnetic element is securely mounted. A groove is defined in an inner side of the bridge.

The secondary optical glasses include a frame having two optical lenses mounted therein. The frame of the secondary optical glasses includes an engaging portion releasably engaged in the groove. A second magnetic element is attached to the engaging portion of the frame of the secondary optical glasses. An inner end of the first magnetic element and an outer end of the second magnetic element attract each other.

In an embodiment of the invention, the bridge of the frame of the primary pair of sunglasses includes another groove in an outer side thereof. The sunglasses lens has an engaging portion releasably mounted in this groove. The engaging portion of the sunglasses lens has a hole into which a third magnetic element is securely mounted for attracting an outer side of the first magnetic element.

The bridge of the frame of the primary pair of sunglasses includes an opening above the groove in the inner side of the bridge for guiding the frame of the secondary optical glasses into the groove in the inner side of the bridge.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
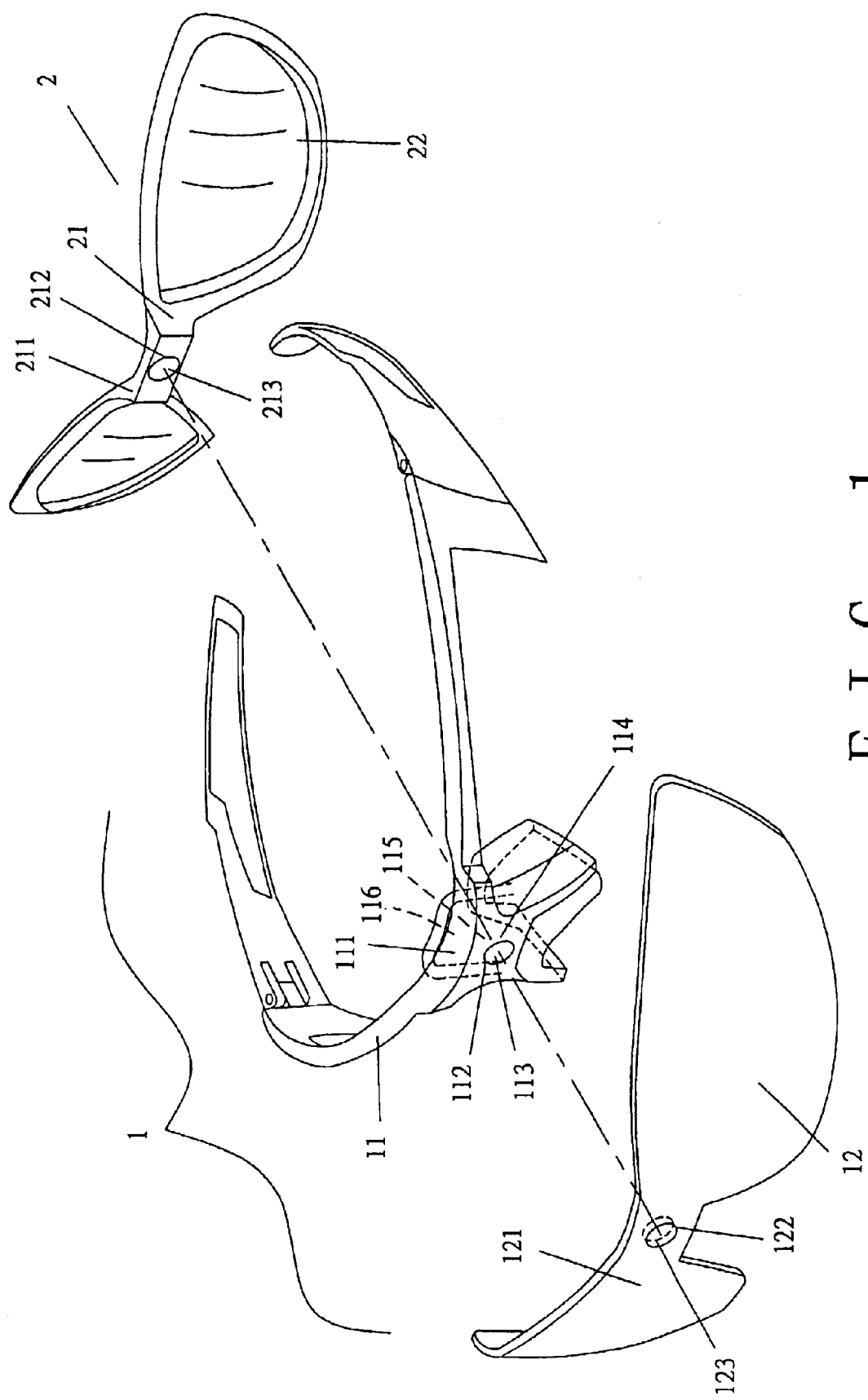
FIG. 1 is an exploded perspective view of a pair of glasses in accordance with the present invention.
Figure 2:
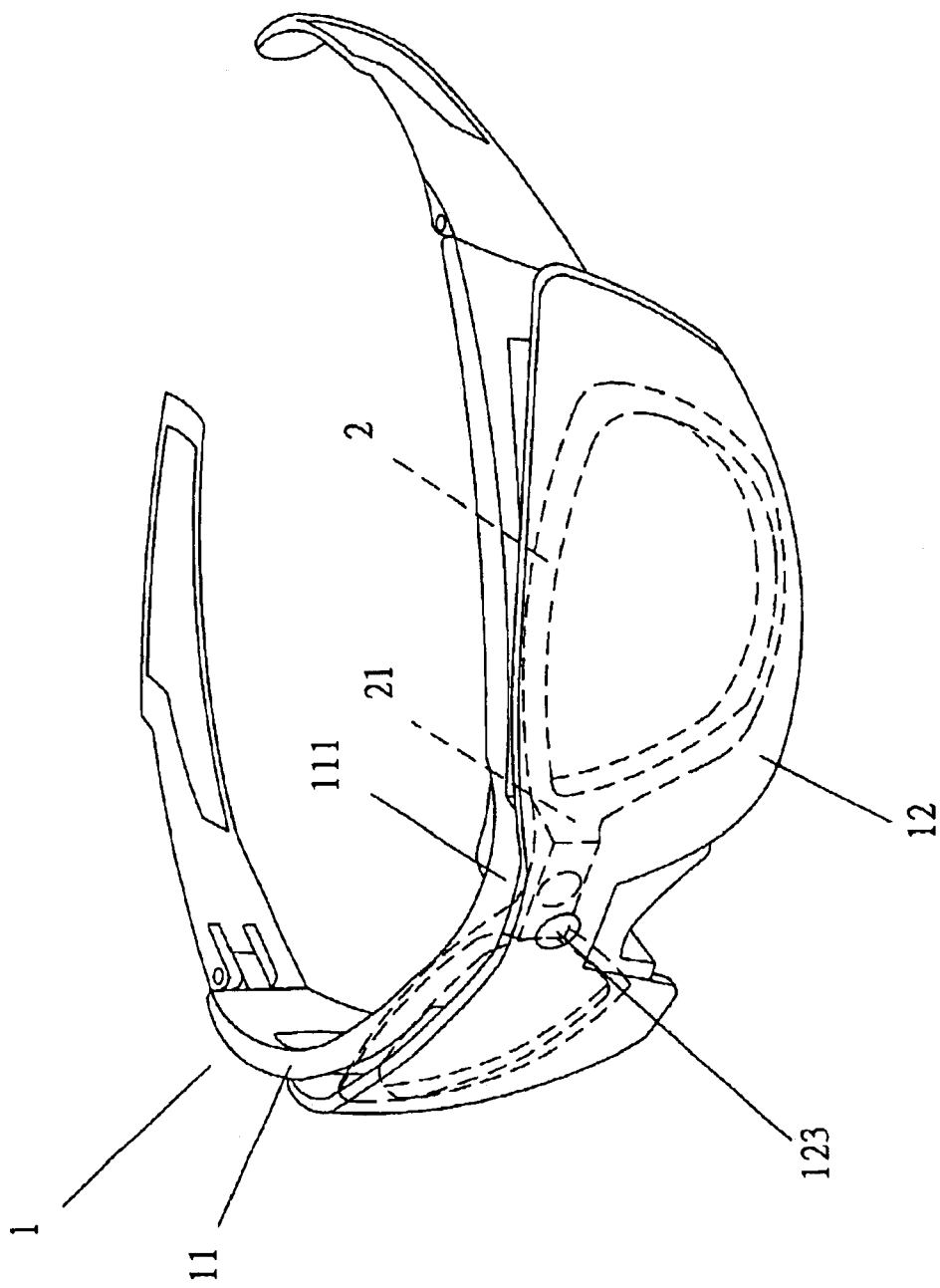
FIG. 2 is a perspective view of the pair of glasses in accordance with the present invention.
Figure 3:
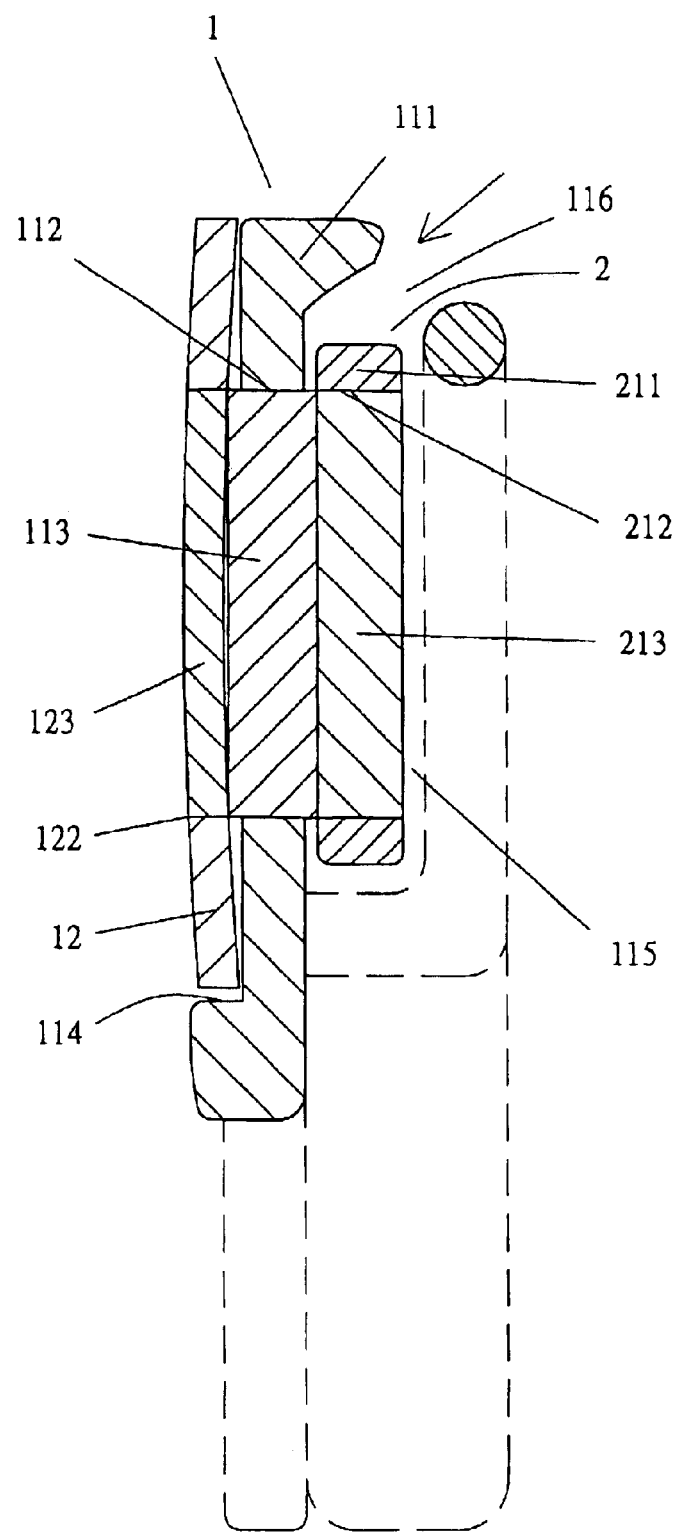
FIG. 3 is a sectional view, in an enlarged scale, of the pair of glasses in accordance with the present invention.

Referring to FIGS. 1 through 3, a pair of glasses in accordance with the present invention generally comprises a primary pair of plastic sunglasses 1 and secondary optical glasses 2. The primary pair of plastic sunglasses I includes a frame 11 having a bridge 111 at a central portion thereof. A through-hole 112 is defined in the bridge 111 and extends from an inner side through an outer side of the bridge 111, and a magnetic element 113 is embedded in the through-hole 112. Further, a groove 114 is defined in the outer side of the bridge 111, and a groove 115 is defined in the inner side of the bridge 111. An opening 116 is defined above the groove 115.

The primary pair of plastic sunglasses 1 further includes a sunglasses lens 12 having an engaging portion 121 at a central portion thereof. The engaging portion 121 of the sunglass lens 12 is releasably inserted into the groove 114 of the bridge 111. Further, the engaging portion 121 of the sunglasses lens 12 has a hole 122 into which a magnetic element 123 is securely mounted. An inner end of the magnetic element 123 and an outer end of the magnetic element 113 attract each other.

The secondary optical glasses 2 include a frame 21 and two optical lenses 22 securely mounted in the frame 21. The frame 21 has an engaging portion 211 at a central portion thereof. The engaging portion 211 of the frame 21 of the secondary optical glasses 2 is releasably inserted into the groove 115 of the bridge 111. Further, the engaging portion 211 of the frame 21 of the secondary optical glasses 2 has a hole 212 into which a magnetic element 213 is securely mounted. An inner end of the magnetic element 113 and an outer end of the magnetic element 213 attract each other.

In assembly, as shown in FIGS. 2 and 3, the engaging portion 121 of the sunglass lens 12 of the primary pair of plastic sunglasses 1 is mounted into the groove 114 of the bridge 111, and the engaging portion 211 of the frame 21 of the secondary optical glasses 2 is mounted into the groove 115 of the bridge 11 via the opening 116 above the groove 115, as indicated by the arrow in FIG. 3. The inner end of the magnetic element 123 and the outer end of the magnetic element 113 attract each other, and the inner end of the magnetic element 113 and the outer end of the magnetic element 213 attract each other. Thus, a single magnetic element 113 is used for attracting two other magnetic elements 123 and 213. The assembling convenience and the utility of the pair of glasses in accordance with the present invention are both improved. Further, the grooves 114 and 115 and the engaging portions 121 and 211 provide an improved positioning effect for the sunglasses lens 12 and the optical glasses 2. Further, a pair of optical glasses can be attached to a pair of sunglasses.

The frame 11 of the primary pair of plastic sunglasses and the sunglasses lens 2 can be engaged with each other by mortise and tenon engagement or other engaging means. A magnetic element on the bridge of the primary pair of plastic sunglasses is sufficient to attract another magnetic element on the secondary optical glasses. Thus, a pair of plastic sunglasses can be engaged with a pair of optical glasses.

Although the invention has been explained in relation to its preferred embodiments, it is to be understood that many other possible modifications and variations can be made without departing from the scope of the invention as hereinafter claimed.

What is claimed is:

1. A pair of glasses comprising:

a primary pair of plastic sunglasses including a frame and a sunglasses lens attached to the frame, the frame of the primary pair of plastic sunglasses including a bridge at a central portion thereof, the bridge having a through-hole, a first magnetic element being securely mounted in the through-hole of the bridge, a groove being defined in an inner side of the bridge; and secondary optical glasses including a frame having two optical lenses mounted therein, the frame of the secondary optical glasses including an engaging portion releasably engaged in the groove, a second magnetic element being attached to the engaging portion of the frame of the secondary optical glasses, an inner end of the first magnetic element and an outer end of the second magnetic element attracting each other.

2. The pair of glasses as claimed in claim 1, wherein the bridge of the frame of the primary pair of sunglasses includes another groove in an outer side thereof, the sunglasses lens having an engaging portion releasably mounted in said another groove, the engaging portion of the sunglasses lens having a hole, a third magnetic element being securely mounted in the hole of the engaging portion of the sunglasses lens for attracting an outer side of the first magnetic element.

3. The pair of glasses as claimed in claim 1, wherein the bridge of the frame of the primary pair of sunglasses includes an opening above the groove in the inner side of the bridge for guiding the frame of the secondary optical glasses into the groove in the inner side of the bridge.

4. A pair of glasses comprising:

a primary pair of plastic glasses including a frame and a sunglasses lens attached to the frame, the frame of the primary pair of plastic sunglasses including a bridge at a central portion thereof, the bridge having a through-hole, a first magnetic element being securely mounted in the through-hole of the bridge, a groove being defined in an inner side of the bridge; and secondary optical glasses including a frame having two optical lenses mounted therein, the frame of the secondary optical glasses including an engaging portion releasably engaged in the groove, a second magnetic element being attached to the engaging portion of the frame of the secondary optical glasses, an inner end of the first magnetic element and an outer end of the second magnetic element attracting each other wherein the bridge of the frame of the primary pair of sunglasses includes another groove in an outer side thereof, the sunglasses lens having an engaging portion releasably mounted in said another groove, the engaging portion of the sunglasses lens having a hole, a third magnetic element being securely mounted in the hole of the engaging portion of the sunglasses lens for attracting an outer side of the first magnetic element.

* * * * *